(12) United States Patent
Kim

(10) Patent No.: US 12,266,755 B2
(45) Date of Patent: Apr. 1, 2025

(54) SECONDARY BATTERY

(71) Applicant: Samsung SDI Co., Ltd., Yongin-si (KR)

(72) Inventor: Mun Sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/536,022

(22) Filed: Dec. 11, 2023

(65) Prior Publication Data

US 2024/0136564 A1 Apr. 25, 2024
US 2024/0234788 A9 Jul. 11, 2024

Related U.S. Application Data

(63) Continuation of application No. 17/281,196, filed as application No. PCT/KR2019/011843 on Sep. 11, 2019, now Pat. No. 11,876,166.

(30) Foreign Application Priority Data

Oct. 1, 2018 (KR) .......................... 10-2018-0117024

(51) Int. Cl.
*H01M 50/528* (2021.01)
*H01M 10/04* (2006.01)
*H01M 10/0587* (2010.01)

(52) U.S. Cl.
CPC ... *H01M 10/0431* (2013.01); *H01M 10/0422* (2013.01); *H01M 10/0587* (2013.01); *H01M 50/528* (2021.01)

(58) Field of Classification Search
CPC ......... H01M 10/0431; H01M 10/0422; H01M 10/0587; H01M 50/528
See application file for complete search history.

(56) References Cited

U.S. PATENT DOCUMENTS 8,173,296 B2 5/2012 Lee
8,541,132 B2 9/2013 Kim
(Continued)

FOREIGN PATENT DOCUMENTS

CN 106992320 A 7/2017
EP 2273601 A1 1/2011
(Continued)

OTHER PUBLICATIONS

Notice of Allowance for Korean Application No. 10-2018-0117024 dated Feb. 15, 2024, 6 pages.
(Continued)

*Primary Examiner* — Jane J Rhee
(74) *Attorney, Agent, or Firm* — Womble Bond Dickinson (US) LLP

(57) ABSTRACT

An embodiment of the present invention provides a secondary battery capable of concurrently securing a vibration characteristic and an insulation function of an electrode assembly by using one finishing tape. To this end, a secondary battery according to an embodiment of the present invention may comprise: an electrode assembly including a first electrode plate, a second electrode plate, and a separator interposed between the first electrode plate and the second electrode plate; a can for receiving the electrode assembly; a cap assembly for sealing the can; a first current collection plate provided above the electrode assembly and electrically connected to the first electrode plate and the cap assembly, respectively; a second current collection plate provided under the electrode assembly and electrically connected to the second electrode plate and the can, respectively; and a finishing tape having a first region which has an adhesive layer formed thereat to surround the circumferential surface of the electrode assembly, and a second region which can (Continued)

surround a space beyond the upper end of the electrode assembly.

6 Claims, 9 Drawing Sheets

(56) References Cited

U.S. PATENT DOCUMENTS

| | | | |
|---|---|---|---|
| 8,546,007 | B2 | 10/2013 | Lee et al. |
| 8,551,646 | B2 | 10/2013 | Choi |
| 8,802,281 | B2 | 8/2014 | Kim |
| 10,014,496 | B2 | 7/2018 | Lim |
| 10,177,399 | B2 | 1/2019 | Kim |
| 2005/0118499 | A1 | 6/2005 | Kim |
| 2008/0152997 | A1 | 6/2008 | Lee |
| 2011/0064995 | A1* | 3/2011 | Kim ............. H01M 50/193 429/174 |
| 2011/0076533 | A1* | 3/2011 | Choi ............. H01M 10/0431 429/185 |
| 2011/0104540 | A1 | 5/2011 | Lee et al. |
| 2011/0287302 | A1 | 11/2011 | Kim |
| 2012/0034513 | A1 | 2/2012 | Kim |
| 2012/0115025 | A1 | 5/2012 | Kim et al. |
| 2016/0141560 | A1 | 5/2016 | Lim |
| 2017/0250437 | A1 | 8/2017 | Kim |

FOREIGN PATENT DOCUMENTS

| | | |
|---|---|---|
| JP | 2003-86234 A | 3/2003 |
| JP | 2005-166664 A | 6/2005 |
| KR | 10-0599641 B1 | 7/2006 |
| KR | 10-0890329 B1 | 3/2009 |
| KR | 10-2011-0034313 A | 4/2011 |
| KR | 10-2011-0047120 A | 5/2011 |
| KR | 10-2011-0127830 A | 11/2011 |
| KR | 10-2012-0013877 A | 2/2012 |
| KR | 10-2016-0059779 A | 5/2016 |
| KR | 10-2017-0101648 A | 9/2017 |

OTHER PUBLICATIONS

International Search Report dated Dec. 18, 2019, for corresponding Application No. PCT/KR2019/011843, 5 pages.
EPO Extended European Search Report dated May 27, 2022, issued in corresponding European Patent Application No. 19868704.8 (9 pages).

* cited by examiner

SECONDARY BATTERY

CROSS-REFERENCE TO RELATED APPLICATIONS

This application is a continuation of U.S. patent application Ser. No. 17/281,196, filed on Mar. 29, 2021, and afforded a 371(c) date of Nov. 4, 2021, which is a U.S. National Phase Patent Application of International Application Number PCT/KR2019/011843, filed on Sep. 11, 2019, which claims priority to Korean Patent Application Number 10-2018-0117024, filed on Oct. 1, 2018, the entire content of both of which is incorporated herein by reference.

TECHNICAL FIELD

An embodiment of the present disclosure relates to a secondary battery.

BACKGROUND ART

A secondary battery is repeatedly charged and discharged, and in general, a low capacity secondary battery may be used for conveniently portable electronic devices, such as cellular phones, notebook computers, or camcorders, and a high capacity secondary battery may be used for electric vehicles.

The secondary battery generally includes an electrode assembly, a can accommodating the electrode assembly and an electrolyte, and a cap assembly sealing the can. Here, the electrode assembly includes a positive electrode plate, a negative electrode plate, and a separator interposed between the positive electrode plate and the negative electrode plate, and is wound in a so-called jelly roll type. The positive electrode plate may be electrically connected to the cap assembly, and the negative electrode plate may be electrically connected to the can. In such as case, to prevent a short circuit, the positive electrode plate should be properly insulated from the can.

The above information disclosed in this Background section is only for enhancement of understanding of the background of the invention and therefore it may contain information that does not form the prior art that is already known to a person of ordinary skill in the art.

DESCRIPTION OF EMBODIMENTS

Technical Problem

An embodiment of the present disclosure provides a secondary battery capable of concurrently securing a vibration characteristic and an insulation function of an electrode assembly by using one finishing tape.

In addition, an embodiment of the present disclosure provides a secondary battery capable of easily installing a current collection plate in a state in which a finishing tape is adhered to an electrode assembly.

Solution to Problem

According to an aspect of the present disclosure, a secondary battery may include an electrode assembly including a first electrode plate, a second electrode plate, and a separator interposed between the first electrode plate and the second electrode plate; a can for receiving the electrode assembly; a cap assembly for sealing the can; a first current collection plate provided above the electrode assembly and electrically connected to the first electrode plate and the cap assembly, respectively; a second current collection plate provided under the electrode assembly and electrically connected to the second electrode plate and the can, respectively; and a finishing tape having a first region which has an adhesive layer formed thereat to surround the circumferential surface of the electrode assembly, and a second region which can surround a space beyond the upper end of the electrode assembly.

In addition, the finishing tape may include a fixing member made of oriented polystyrene (OPS) or thermoplastic vulcanizate (TPV), and an insulation member made of an insulating material, the fixing member is provided over a lower portion of the first region, and the insulation member is provided over an upper portion of the first region and the second region.

In addition, the finishing tape may include a fixing member made of OPS or TPV, and an insulation member made of an insulating material, the fixing member is provided over the first region and the second region, and the insulation member is provided to surround the fixing member.

In addition, the insulation member may be made of polyethylene terephthalate (PET), polypropylene (PP), or polyimide (PI).

In addition, the second region may be beaded with the can.

ADVANTAGEOUS EFFECTS OF DISCLOSURE

As described above, an embodiment of the present disclosure provides a secondary battery, in which a finishing tape includes a fixing member made of OPS or TPV, and an insulation member made of an insulating material, and the fixing member and the insulation member are integrally formed through an adhesive layer, thereby concurrently securing a vibration characteristic and an insulation function of an electrode assembly by using one finishing tape, and saving processing costs and time.

Here, the adhesive layer is formed only at a region surrounding the circumferential surface of the electrode assembly and is not formed at a region which can surround a space beyond the upper end of the electrode assembly, thereby easily installing a current collection plate in a state in which the finishing tape is attached to the electrode assembly.

MODE OF DISCLOSURE

Figure 1:
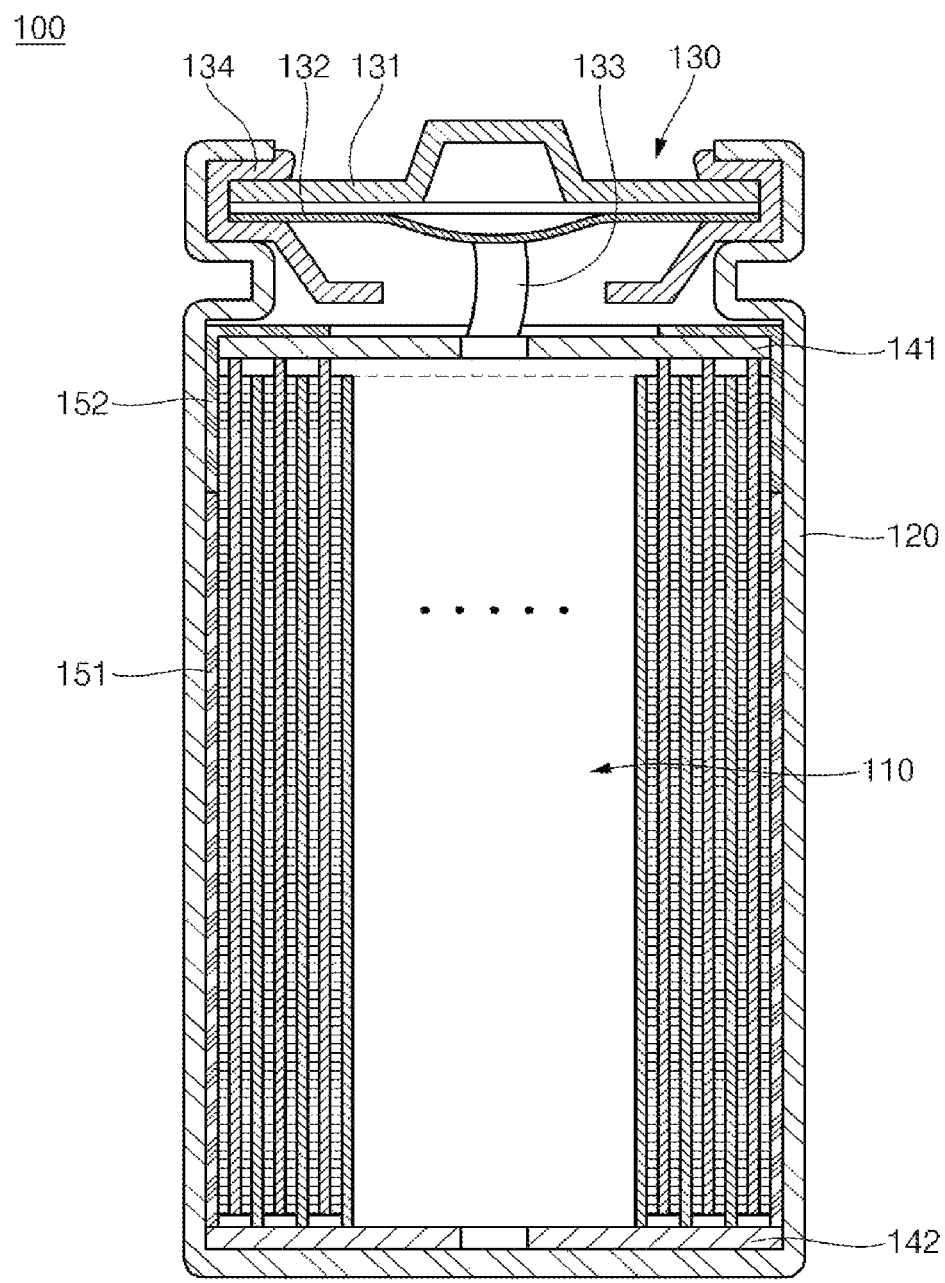
FIG. 1 is a cross-sectional view of a secondary battery according to an embodiment of the present disclosure.

Hereinafter, preferred embodiments of the preset disclosure will be described in detail with reference to the accompanying drawings.

The preferred embodiments further illustrate the present invention specifically, however, these embodiments are only for helping of understanding of the present disclosure and may be embodied in many different forms and should not be construed as being limited to the example (or exemplary) embodiments set forth herein. Rather, these example embodiments are provided so that this disclosure will be thorough and complete, and will fully convey the scope of the present inventive concept to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
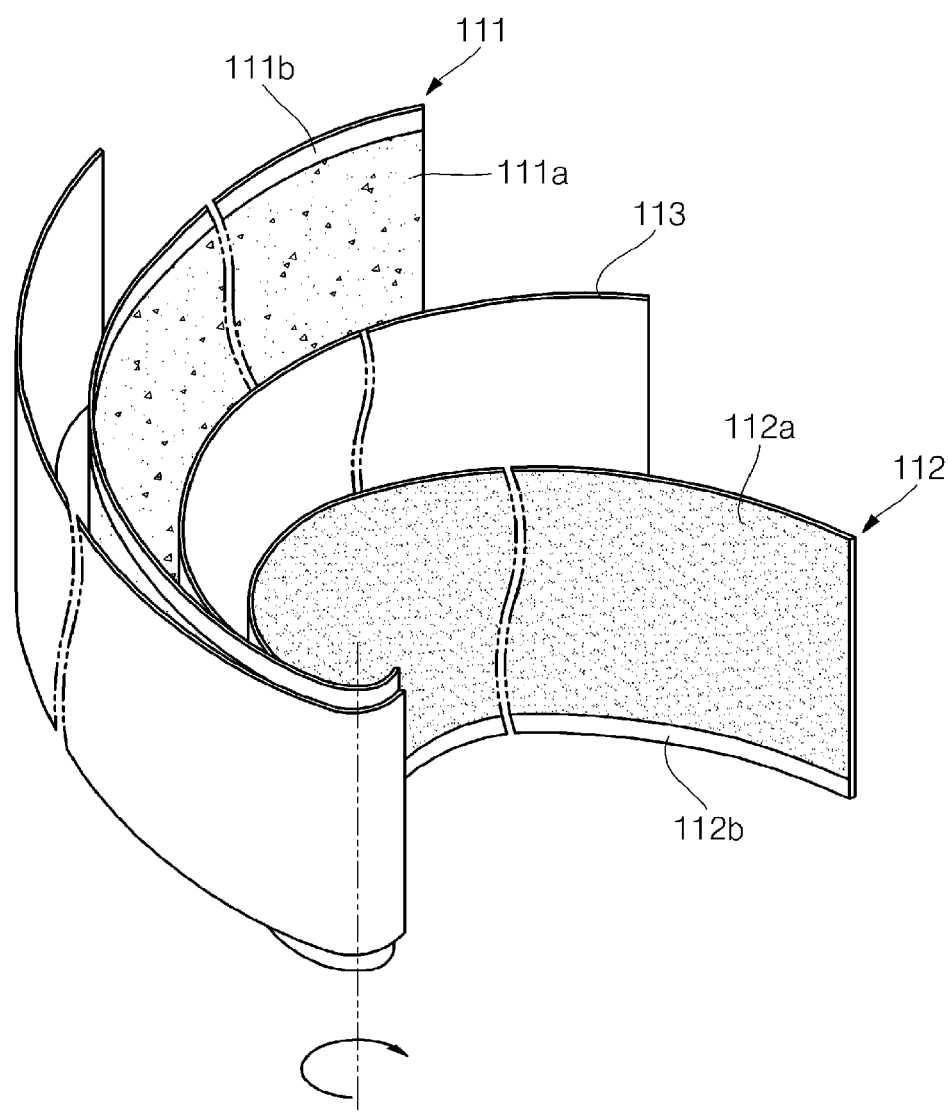
FIG. 2 is a conceptual view of an electrode assembly of the secondary battery according to an embodiment of the present disclosure.

FIG. 1 is a cross-sectional view of a secondary battery 100 according to an embodiment of the present disclosure, and FIG. 2 is a conceptual view of an electrode assembly 110 of the secondary battery 100 according to an embodiment of the present disclosure.

First, referring to FIG. 1, the secondary battery 100 includes the electrode assembly 110, can 120, a cap assembly 130, a first current collection plate 141, a second current collection plate 142, and a finishing tape 150.

As shown in FIG. 2, the electrode assembly 110 may include a first electrode plate 111, a second electrode plate 112, and a separator 113, and may be wound in a so-called jelly roll type.

Here, the first electrode plate 111 may be a positive electrode plate. In this case, the first electrode plate 111 includes a first electrode current collector formed of, for example, an aluminum foil, and a first electrode active material 111a including, for example, a transition metal oxide, and coated on a portion of the first electrode current collector. Here, the first electrode active material 111a may be coated on one end of the first electrode current collector, for example, on the remaining portion of the first electrode current collector, except for the upper end thereof, as shown. In other words, a first uncoated portion 111b, corresponding to a region on which the first electrode active material 111a is not coated, may be formed along the upper end of the first electrode current collector.

In addition, the second electrode plate 112 may be a negative electrode plate. In this case, the second electrode plate 112 may include a second electrode current collector formed of, for example, a copper or nickel foil, and a second electrode active material 112a including, for example, graphite or carbon, and coated on a portion of a second electrode current collector. Here, the second electrode active material 112a may be coated on the other end of the second electrode current collector, for example, on the remaining portion of the second electrode current collector, except for the lower end thereof, as shown. In other words, a second uncoated portion 112b, corresponding to a region on which the second electrode active material 112a is not coated, may be formed along the lower end of the second electrode current collector.

In some cases, the first electrode plate 111 may be a negative electrode plate, and the second electrode plate 112 may be a positive electrode plate.

The separator 113, interposed between the first electrode plate 111 and the second electrode plate 112, may prevent a short circuit between the first electrode plate 111 and the second electrode plate 112, while allowing movement of lithium ions, etc. The separator 113 may be made of polyethylene (PE), polypropylene (PP), or a composite film of PE and PP.

The can 120 is shaped of, for example, a cylinder having an open top surface, and may accommodate the electrode assembly 110 and an electrolyte.

The cap assembly 130 is coupled to a top end of the can 120 and then seals the can 120.

The cap assembly 130 includes a cap plate 131, a safety vent 132, a lead 133, and a gasket 134.

The cap plate 131 includes an upwardly protruding terminal portion, and has holes formed around the terminal portion, for discharging gases.

When the internal pressure exceeds a predetermined pressure level by gases generated due to overcharge or operational abnormality of the secondary battery, the safety vent 132 is spontaneously broken and thus the generated gases are discharged to the outside, thereby preventing explosion of the secondary battery.

The lead 133 may electrically connect the electrode assembly 110 and the cap plate 131 through a first current collection plate 141, which will later be described.

The gasket 134 may surround the cap plate 131 and the safety vent 132, and thus may be insulated from the can 120.

The first current collection plate 141 is electrically connected to the first uncoated portion 111b of the first electrode plate 111 and the lead 133 of the cap assembly 130 from an upper side of the electrode assembly 110, respectively.

In addition, the second current collection plate 142 is electrically connected to the second uncoated portion 112b of the second electrode plate 112 and a bottom portion of the can 120 from a lower side of the electrode assembly 110, respectively.

Therefore, as stated above, if the first electrode plate 111 is a positive electrode plate, and the second electrode plate 112 is a negative electrode plate, the cap plate 131 may have a positive polarity, and the can 120 may have a negative polarity.

The finishing tape 150 (151; 152) includes a first region which has an adhesive layer formed thereat to surround the circumferential surface of the electrode assembly 110, and a second region which can surround a space beyond the upper end of the electrode assembly 110.

In another example embodiment, the finishing tape 150 may also include a fixing member 151 and an insulation member 152.

The fixing member 151 may function to secure a vibration characteristic and an insulation function of the electrode assembly 110, and may be made of oriented polystyrene (OPS) or thermoplastic vulcanizate (TPV). The fixing member 151 is provided over a relatively lower portion and the central portion of the first region of the finishing tape 150.

In addition, the insulation member 152 may function to insulate the electrode assembly 110 from the can 120, and may include, for example, polyethylene terephthalate (PET), polypropylene (PP), or polyimide (PI). The insulation member 152 is provided in a relatively upper portion of the first region and the second region of the finishing tape 150.

Specifically, the finishing tape 150 may be fabricated by integrally forming the fixing member 151 and the insulation member 152 in the following manner.

Figure 3A:
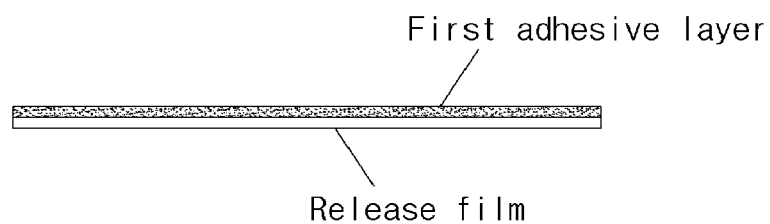
FIGS. 3A to 3C sequentially show a process of fabricating a finishing tape of the secondary battery according to an embodiment of the present disclosure.
Figure 3B:
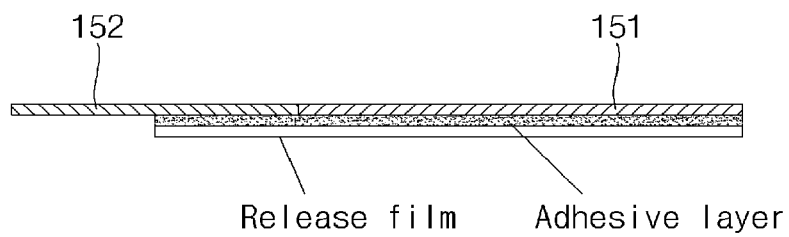
Figure 3C:
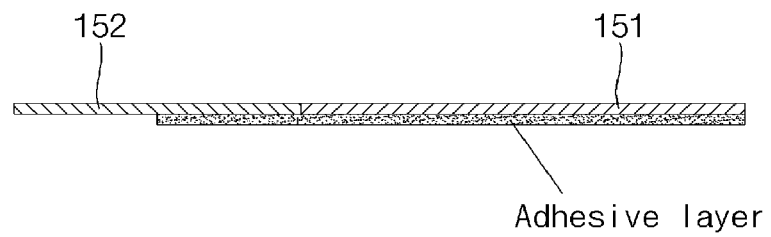

FIGS. 3A to 3C sequentially show a process of fabricating the finishing tape 150 of the secondary battery 100 according to an embodiment of the present disclosure.

First, as shown in FIG. 3A, an adhesive layer is coated on a release film and then dried (that is, a solvent is evaporated).

Next, as shown in FIG. 3B, the fixing member 151 and the insulation member 152 are arranged on the adhesive layer so as to be adjacent to each other. Here, the overall area of the fixing member 151 is disposed on the adhesive layer. However, with regard to the insulation member 152, only a partial area thereof is disposed on the adhesive layer and the remaining area thereof is disposed outside the adhesive layer.

Lastly, as shown in FIG. 3C, the release film is removed, and thus the finishing tape 150 may be completed (that is, a transfer process).

As such, the fixing member 151 may have an adhesive layer entirely formed thereon, and the insulation member 152 may have an adhesive layer formed on only a region thereof adjacent to the fixing member 151.

Figure 4A:
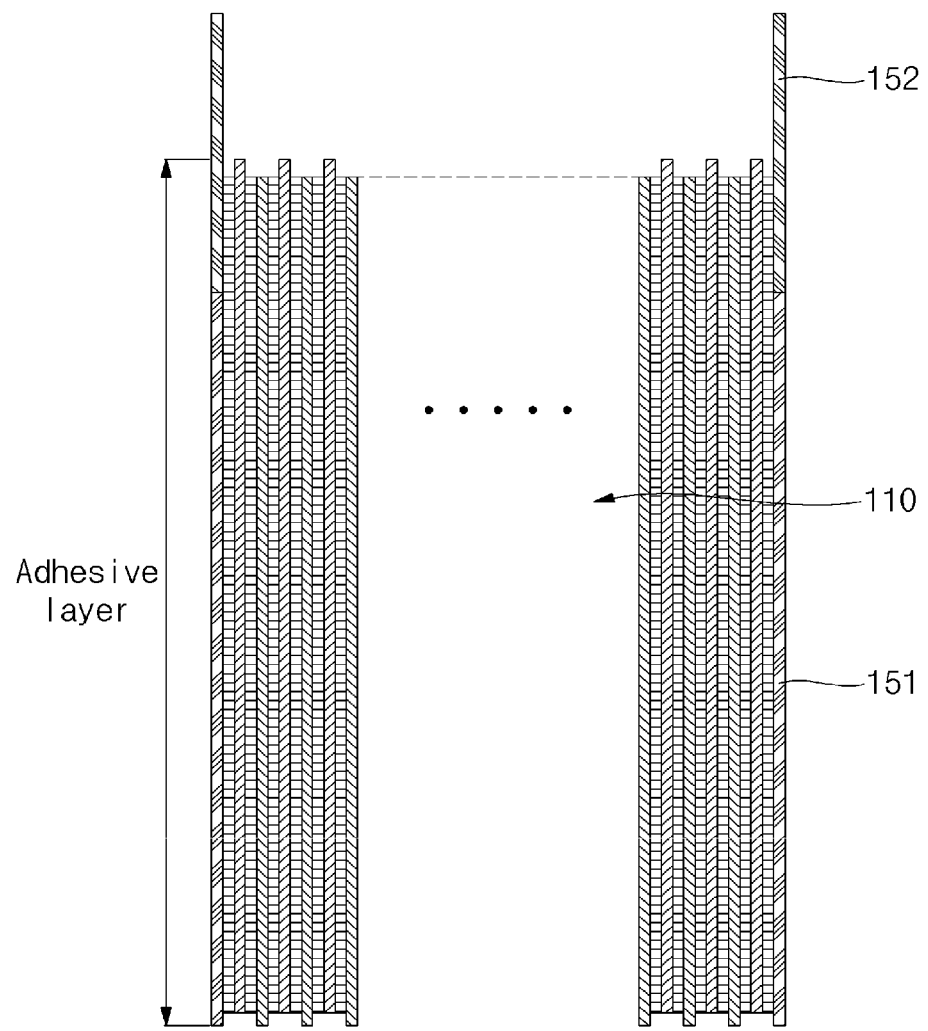
FIGS. 4A and 4B sequentially show a process of attaching a finishing tape to an electrode assembly and installing a current collection plate in the secondary battery according to an embodiment of the present disclosure.
Figure 4B:
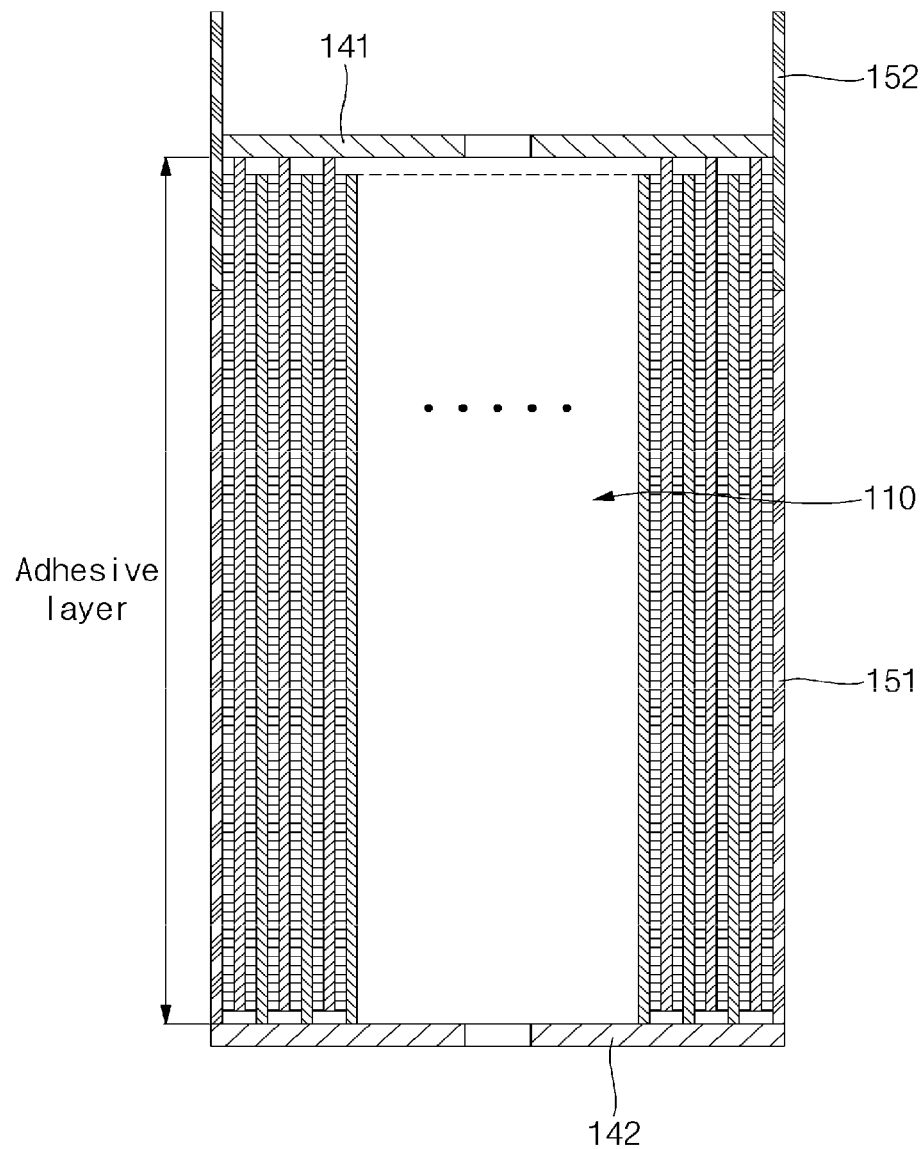

Therefore, as shown in FIG. 4A, when the finishing tape 150 is attached to the electrode assembly 110, the fixing member 151 surrounds the relatively lower portion and the central portion of the circumferential surface of the electrode assembly 110, and the insulation member 152 surrounds a space beyond the upper end of the electrode assembly 110. A region of the insulation member 152 surrounding the space beyond the upper end of the electrode assembly 110 is a second region on which the adhesive layer is not formed, and thus the first current collection plate 141 may be easily inserted into the second region, to then be installed therein, as shown in FIG. 4B.

Thereafter, the second region is beaded with the can 120, as shown in FIG. 1.

Hereinafter, a secondary battery according to another embodiment of the present disclosure will be described with reference to FIGS. 5 and 6.

The secondary battery according to another embodiment of the present disclosure differs from the secondary battery 100 according to an embodiment of the present disclosure having been described above with reference to FIGS. 1 to 4 with respect to structure of a finishing tape 250 (251; 252).

Other features of the secondary battery according to another embodiment are substantially the same as those of the secondary battery 100 according to an embodiment, and if there is any difference therebetween, said difference is merely a matter which could be predicted to be implemented by a person skilled in the art through a change, and thus a repeated explanation thereof will be omitted.

FIGS. 5A to 5E sequentially show a process of fabricating a finishing tape 250 of a secondary battery according to another embodiment of the present disclosure.

Figure 5A:
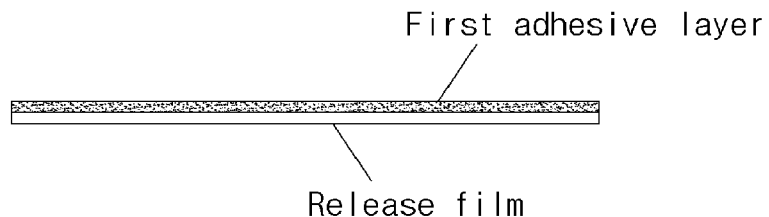
FIGS. 5A to 5E sequentially show a process of fabricating a finishing tape of a secondary battery according to another embodiment of the present disclosure.

First, as shown in FIG. 5A, a first adhesive layer is coated on a release film and then dried.

Figure 5B:
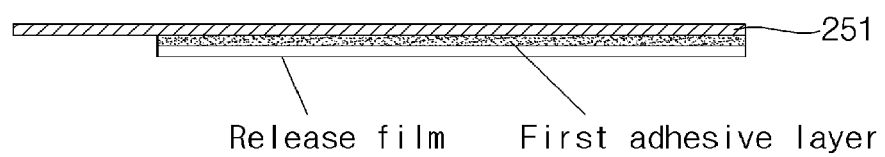

Next, as shown in FIG. 5B, a fixing member 251 is disposed on a first adhesive layer. Here, only a partial area of the fixing member 251 is disposed on the first adhesive layer, and the remaining area thereof is disposed outside the first adhesive layer.

Figure 5C:
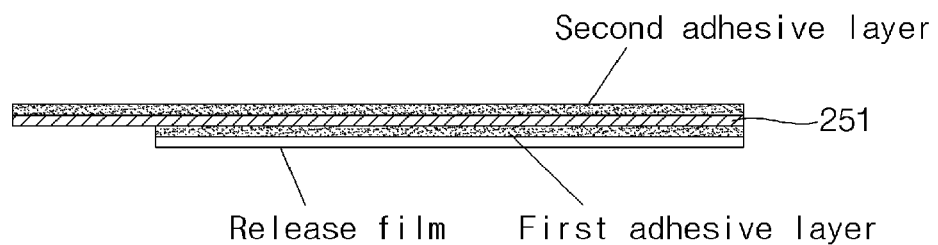
Figure 5D:
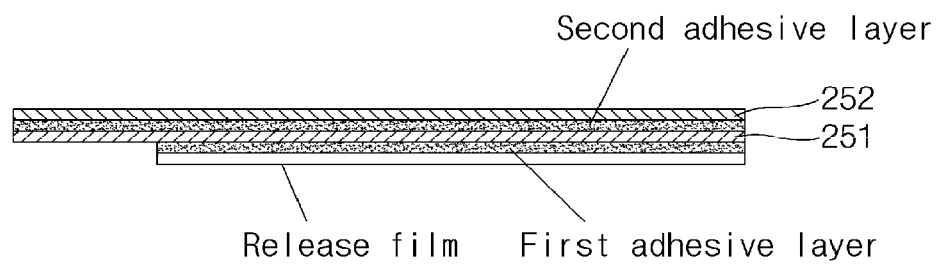

Next, as shown in FIG. 5C, a second adhesive layer is coated on the fixing member 251, and, as shown in FIG. 5D, an insulation member 252 is disposed so as to overlap on the second adhesive layer.

Figure 5E:
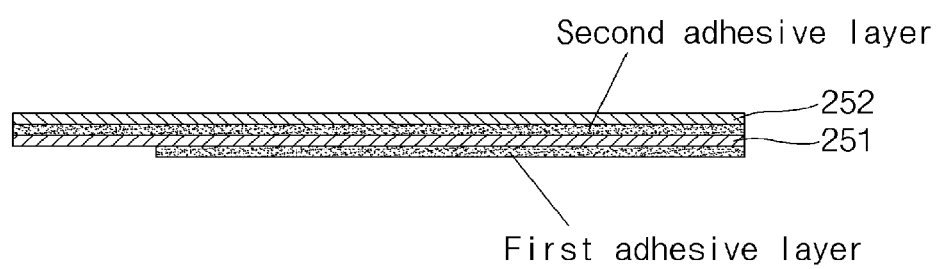

Lastly, as shown in FIG. 5E, the release film is removed, and thus the finishing tape 250 may be completed.

Figure 6A:
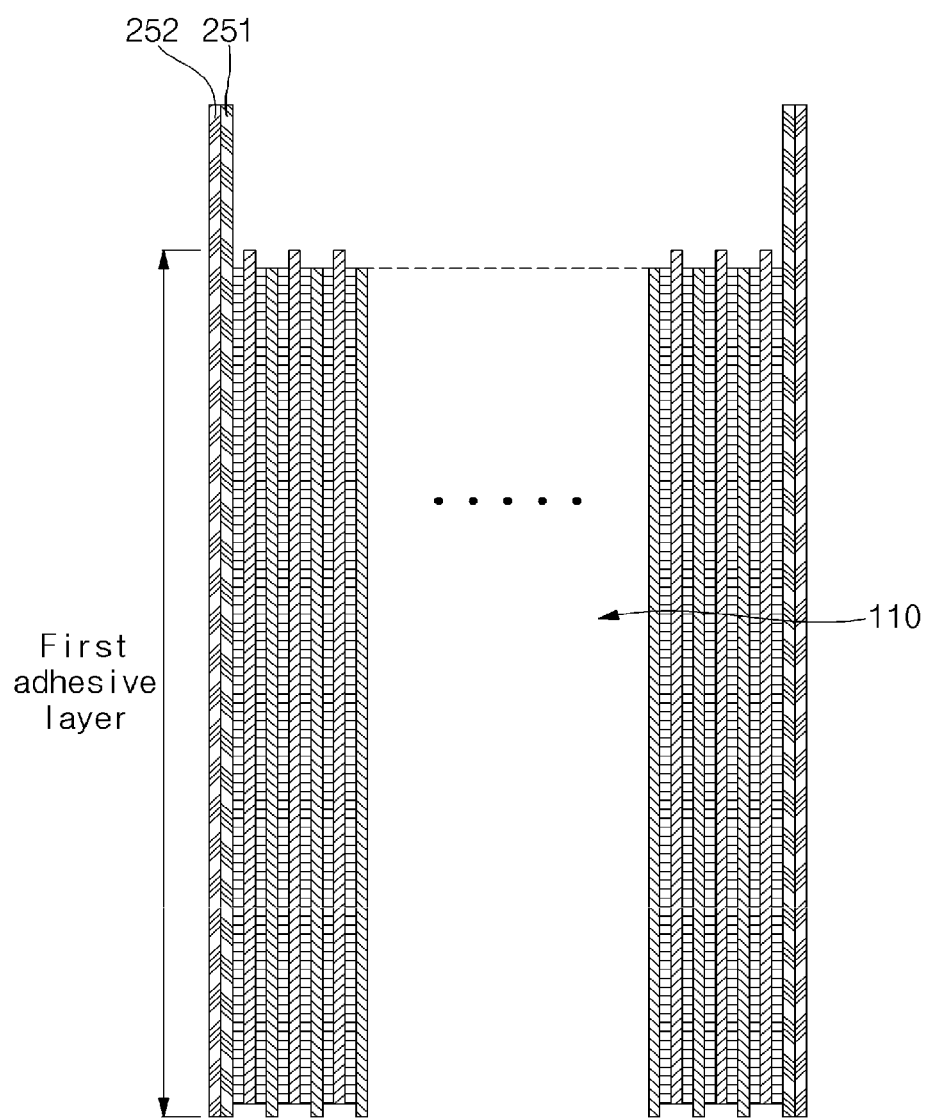
FIGS. 6A and 6B sequentially show a process of attaching a finishing tape to an electrode assembly and installing a current collection plate in the secondary battery according to an embodiment of the present disclosure.
Figure 6B:
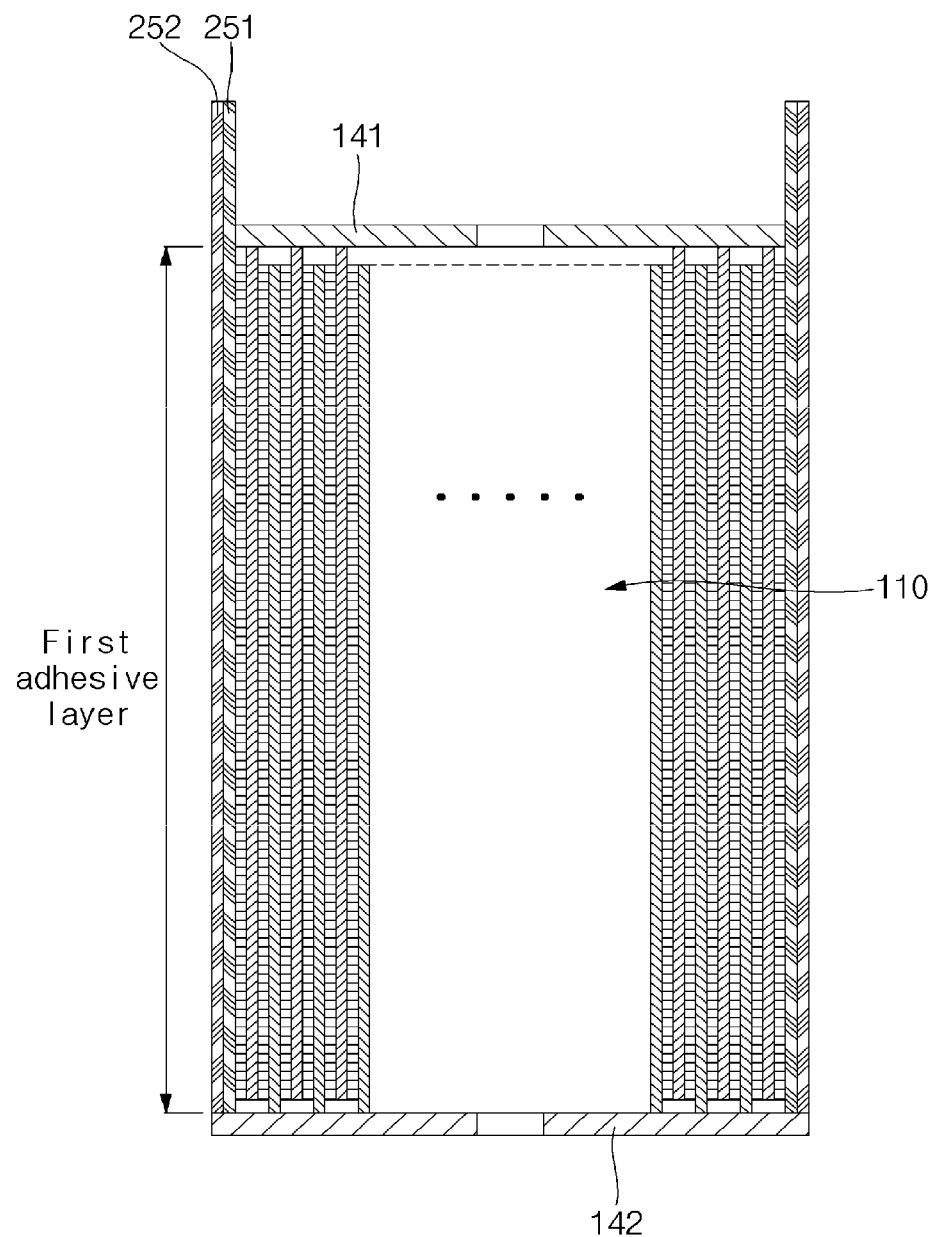

As such, as shown in FIG. 6A, when the finishing tape 250 is attached to the electrode assembly 110, a region where the first adhesive layer is formed may surround the circumferential surface of the electrode assembly 110, and a region on which the first adhesive layer is not formed may surround a space beyond the upper end of the electrode assembly 110. Therefore, as shown in FIG. 6B, a first current collection plate 141 may be easily inserted into the region on which first adhesive layer is not formed, to then be installed therein.

While the foregoing embodiment has been described to practice the secondary battery of the present disclosure, it will be understood by those of ordinary skill in the art that various changes in form and details may be made therein without departing from the spirit and scope of the present disclosure as defined by the following claims.

DESCRIPTION OF REFERENCE NUMERALS

100: Secondary battery
110: Electrode assembly
111: Positive electrode plate
112: Negative electrode plate
113: Separator
120: Can
130: Cap assembly
131: Cap plate
132: Safety vent 133: Lead
134: Gasket
141: First current collection plate
142: Second current collection plate
150: Finishing tape
151: Fixing member
152: Insulation member

The invention claimed is:

1. A secondary battery comprising:
   an electrode assembly;
   a can accommodating the electrode assembly;
   a current collector plate having a first surface electrically connected to an end of the electrode assembly; and
   a finishing tape including a fixing member having an adhesive layer formed on at least a portion thereof and surrounding a circumferential surface of the electrode assembly, and an insulating member having an adhesive layer formed on at least a portion thereof and capable of surrounding the end of the electrode assembly and a periphery of the current collector plate, wherein the insulating member comprises a region covering a second surface of the current collector plate, which is opposite to the first surface of the current collector plate.

2. The secondary battery as claimed in claim 1, wherein the fixing member and the insulating member are disposed on a same plane at boundaries thereof.

3. The secondary battery as claimed in claim 1, wherein the finishing tape includes an adhesive layer disposed across both of the fixing member and the insulating member.

4. The secondary battery as claimed in claim 1, wherein the fixing member is made of an OPS or TPV material.

5. The secondary battery as claimed in claim 1, wherein the insulating member is made of a PET, PP, or PI material.

6. The secondary battery as claimed in claim 1, wherein the can includes a beading part, and the insulating member is adjacent to the beading part.

* * * * *